US008801573B2

(12) United States Patent
Ohashi et al.

(10) Patent No.: US 8,801,573 B2
(45) Date of Patent: *Aug. 12, 2014

(54) POWER TRANSMITTING APPARATUSES

(75) Inventors: Tatsuyuki Ohashi, Hamamatsu (JP);
Shouji Asatsuke, Hamamatsu (JP); Akio Oishi, Hamamatsu (JP); Ryouhei Chiba, Hamamatsu (JP); Jun Ishimura, Hamamatsu (JP); Keiichi Ishikawa, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,573

(22) Filed: Jul. 3, 2012

(65) Prior Publication Data

US 2012/0270702 A1    Oct. 25, 2012

Related U.S. Application Data

(63) Continuation of application No. 13/235,157, filed on Sep. 16, 2011, now Pat. No. 8,246,511, which is a continuation of application No. PCT/JP2010/054513, filed on Mar. 17, 2010.

(30) Foreign Application Priority Data

Mar. 18, 2009    (JP) ................................. 2009-066747

(51) Int. Cl.
     *B60W 10/04*    (2006.01)
(52) U.S. Cl.
     USPC ............................................ 477/110; 477/53
(58) Field of Classification Search
     USPC ............... 477/38–41, 45, 50, 53, 71, 74, 199, 477/200, 204, 101, 110; 74/665 GE
     See application file for complete search history.

(56) References Cited

U.S. PATENT DOCUMENTS 4,967,621 A * 11/1990 Soga et al. ...................... 477/49
5,088,352 A    2/1992 Ishimaru
(Continued)

FOREIGN PATENT DOCUMENTS

| JP | 2000-328980 | 11/2000 |
| JP | 2001-289085 | 10/2001 |

(Continued)

OTHER PUBLICATIONS

International Search Report for PCT/JP2010/054513, mailed May 11, 2010.

(Continued)

*Primary Examiner* — David D Le
*Assistant Examiner* — Huan Le
(74) *Attorney, Agent, or Firm* — Knobbe Martens Olson & Bear LLP

(57) ABSTRACT

A power transmitting apparatus for a vehicle mounted with a torque converter and an idle-stop mechanism can be configured to improve fuel economy without cancelling a fuel-cut-off during vehicle speed reduction and to reduce the manufacturing cost by eliminating an electrically-driven oil pump. A power transmitting apparatus can comprise a torque converter, a clutch mechanism, an oil pump, a continuously variable transmission, a clutch control device, an engine control device, and a flow control device. The flow control device can be configured to limit or prevent the supply of oil to the torque converter by the oil pump and to prioritize the supply of oil to the clutch mechanism and the continuously variable transmission when the vehicle speed is reduced below a predetermined value with fuel being cut off by the engine control device during vehicle speed reduction.

13 Claims, 15 Drawing Sheets

(56) References Cited

U.S. PATENT DOCUMENTS

| | | | |
|---|---|---|---|
| 5,417,621 A | 5/1995 | Tibbles | |
| 6,482,127 B2 | 11/2002 | Katou | |
| 6,881,170 B2 * | 4/2005 | Onoyama et al. | 477/39 |
| 7,192,383 B2 | 3/2007 | Shimada et al. | |
| 7,524,266 B2 * | 4/2009 | Nobumoto et al. | 477/110 |
| 7,556,588 B2 * | 7/2009 | Park | 477/202 |
| 7,558,666 B2 | 7/2009 | DiGonis | |
| 7,693,636 B2 * | 4/2010 | Katou et al. | 701/54 |
| 8,246,511 B2 | 8/2012 | Ohashi et al. | |
| 2003/0197385 A1 | 10/2003 | Onoyama et al. | |
| 2005/0014604 A1 * | 1/2005 | Sakakibara et al. | 477/45 |
| 2006/0189436 A1 | 8/2006 | Nakashima et al. | |
| 2009/0298644 A1 | 12/2009 | Nihei et al. | |
| 2012/0053012 A1 | 3/2012 | Yamada et al. | |
| 2012/0135839 A1 * | 5/2012 | Watanabe et al. | 477/110 |

FOREIGN PATENT DOCUMENTS

| | | |
|---|---|---|
| JP | 2003-314321 | 11/2003 |
| JP | 2005-003193 | 1/2005 |
| JP | 2005-98392 | 4/2005 |
| JP | 2003-227565 | 8/2005 |
| JP | 2006-348862 | 12/2006 |

OTHER PUBLICATIONS

Microfilm of the specification and drawings annexed to the request of Japanese utility Model Application No. 118068/1987 (Laid-open No. 024760/1989), Feb. 10, 1989, Nissan Diesel Motor, Co., Ltd.

International Search Report for PCT/JP2010/054514 mailed May 11, 2010.

* cited by examiner

Fig 10

| Mode | Shift solenoid VLV. | | Clutch | | Torque converter flow rate |
|---|---|---|---|---|---|
| | SH A (29) | SH B (30) | 1st clutch device | 2nd clutch device | |
| Idle-stop & 2nd clutch devices start / speed reduction | × | × | × | Linear solenoid A (28) | Small |
| 1st clutch device | ○ | ○ | Line pressure | × | Large |
| 1st clutch device in-gear | × | ○ | Linear solenoid A (28) | × | Large | ns
POWER TRANSMITTING APPARATUSES

CROSS-REFERENCE TO RELATED APPLICATIONS

This application is a continuation of U.S. application Ser. No. 13/235,157, filed Sep. 16, 2011, which is a continuation of PCT Application No. PCT/JP2010/054513, filed on Mar. 17, 2010, which claims priority to Japanese Application No. 2009-066747, filed on Mar. 18, 2009, the entire contents of each of which are hereby incorporated by reference.

BACKGROUND OF THE INVENTIONS

1. Field of the Inventions

The present inventions relate to power transmitting apparatuses, such as vehicle transmissions, which transmit power from an engine of a vehicle to the wheels of the vehicle and which are configured to properly select transmission of power and cutting-off of power to or from the wheels.

2. Description of the Related Art

Two types of known power transmitting apparatuses for vehicles (e.g., "automatic transmissions") provide starting power (power for initiating movement of the vehicle from a stop) in different ways. One type uses a torque converter ("torque converter type") and another type uses a starting clutch ("starting clutch type") to provide starting power used to start the movement of the vehicle from a stop. In the torque converter type devices, the starting performance benefits from the torque amplifying function of the torque converter. On the other hand, the starting clutch type benefits from increased efficiency because this type of system does not continuously lose power through slippage which occurs in the torque converter types e.g. during a steady running of vehicle.

Japanese Laid-open Patent Publication No. 3193/2005 discloses a power transmitting apparatus which is a torque converter type automatic transmission combined with a lock-up clutch. In this transmission, the lock-up clutch has a clutch piston connected to a turbine of a torque converter and is movable between a connected position in which it abuts against the inner circumferential surface of a torque converter cover and a non-connected separated position. Thus, the torque converter cover and the turbine can be directly connected and disconnected via the clutch piston.

Japanese Laid-open Patent Publication No. 328980/2000 discloses a power transmitting apparatus of the torque converter type having an idle-stop function for automatically stopping an engine when a vehicle is stopped. This power transmitting apparatus comprises a continuously variable transmission (sometimes called a "CVT") and an oil pump driven by power from the engine to supply the CVT and a clutch mechanism with oil and configured to operate the CVT, the clutch mechanism, and the torque converter.

SUMMARY OF THE INVENTIONS

An aspect of at least one of the inventions disclosed herein includes the realization that a power transmitting apparatus for a vehicle with a torque converter and an idle-stop mechanism can be configured to improve fuel consumption by avoiding cancellation of fuel-cut-off during vehicle speed reduction without adding an electrically-driven oil pump.

In the power transmitting apparatus of the prior art, when the transmission ratio (effective gear ratio) of a CVT must be changed (e.g., to a lower transmission ratio (larger number ratio) in preparation for the next initiation of movement) and vehicle speed has been reduced below a predetermined value because fuel has been cut off from an engine during vehicle speed reduction, then engine speed (RPM) must be temporally increased by cancelling the fuel-cut-off (i.e. resuming of fuel injection), which disadvantageously deteriorates fuel economy.

More specifically, since the rotation, and thus the operation, of an oil pump would be substantially reduced when vehicle speed is reduced below a predetermined value and, accordingly, changing the CVT transmission ratio would become impossible, it is necessary to cancel the fuel-cut-off to temporally increase the engine speed so that the oil pump would be able to operate sufficiently. For a vehicle performing an idle-stop in particular, it is necessary to change to a lower transmission ratio during vehicle speed reduction to prepare for the next initiation of vehicle movement since operation of the CVT would be impossible because the engine would be stopped while the vehicle is stopped.

Although it is possible to change the transmission ratio of the CVT during vehicle operation regardless of the engine speed (or speed of vehicle) without canceling fuel-cut-off by providing with an electrically-driven oil pump separate from the engine-driven oil pump, this would disadvantageously increase of the manufacturing cost of the power transmitting apparatus due to the addition of the electrically-driven oil pump.

Thus, in accordance with an embodiment, a power transmitting apparatus can comprise a torque converter having a torque amplifying function, a clutch mechanism, an oil pump, a continuously variable transmission, a clutch control device, an engine control device, and a flow control device. The clutch mechanism can be configured to be positioned in a first power transmitting condition in which driving power of an engine is transmitted to driving wheels via a power transmitting system of the torque converter and a second power transmitting condition in which the driving power of the engine is transmitted to the wheels without the power transmitting system of the torque converter. The oil pump can be driven by the driving power of the engine to supply oil to the clutch mechanism and the torque converter to operate them. The continuously variable transmission can be supplied with oil by the oil pump to actuate pulleys by hydraulic pressure of the oil to continuously vary the transmission ratio. The clutch control device can be configured to selectively operate the clutch mechanism in accordance with a vehicle condition to position the clutch mechanism either in the first power transmitting condition or the second power transmitting condition. The engine control device can be configured to idle-stop the engine by automatically stopping the engine when vehicle speed is reduced below a predetermined value and to restart the engine when the accelerator pedal is depressed or the brakes are released during an idle-stopped condition. The flow control device can be configured to limit or prevent the supply of oil to the torque converter by the oil pump and to prioritize the supply of oil to the clutch mechanism and the continuously variable transmission when the vehicle speed is reduced below a predetermined value with fuel being cut off by the engine control device during vehicle speed reduction.

In some embodiments, the flow control device can comprise a hydraulic valve mechanism having a first supply path configured to normally supply oil to the torque converter, a second supply path configured to limit or prevent the supply of oil, and a valve configured to open and close the first supply path by hydraulic pressure.

In some embodiments, the valve can be normally urged in a direction for closing the first supply path.

In some embodiments, the power transmitting apparatus can further comprise an accumulator configured to accumulate the oil and can be configured so that the oil accumulated in the accumulator is discharged therefrom to the clutch mechanism and the continuously variable transmission when the vehicle speed is reduced below a predetermined value with fuel to the engine being cut off during a process of vehicle speed reduction.

In some embodiments, the clutch mechanism can comprise a first clutch device operated during forward vehicle operation and configured to transmit the driving power of the engine to the driving wheels via the power transmitting system of the torque converter and a second clutch device operated during forward vehicle operation and configured to transmit the driving power of the engine to the driving wheels without the power transmitting system of the torque converter, the clutch control device can be configured to selectively operate the first clutch device and the second clutch device in accordance with the vehicle condition to position them in either the first power transmitting condition or the second power transmitting condition, and the clutch control device can be configured to operate only the second clutch device when the vehicle speed is reduced below a predetermined value with fuel to the engine being cut off during a process of vehicle speed reduction.

In some embodiments, the power transmitting apparatus can further comprise a first driving shaft connected to the first clutch device and a second driving shaft connected to the second clutch device. The first driving shaft can be configured to be rotated by the driving power of the engine via the power transmitting system of the torque converter. The second driving shaft can be configured to be rotated by the driving power of the engine without the power transmitting system of the torque converter. The first and second driving shafts can be arranged coaxially with each other.

In some embodiments, the clutch mechanism can comprise a forward-operation clutch device operated during forward vehicle operation and a lock-up clutch device. The forward-operation clutch device can be configured to transmit the driving power of the engine to the driving wheels via the power transmitting system of the torque converter. The lock-up clutch device can be configured to transmit the driving power of the engine to the driving wheels without the power transmitting system of the torque converter. The clutch control device can be configured to selectively operate the forward-operation clutch device and the lock-up clutch device in accordance with the vehicle condition to position them in either the first power transmitting condition or the second power transmitting condition.

In some embodiments, the engine control device can prompt an idle-stop when the transmission ratio of the continuously variable transmission is a predetermined value or more.

In some embodiments wherein the power transmitting apparatus further comprises a flow control device configured to limit or prevent the supply of oil to the torque converter by the oil pump and to prioritize the supply of oil to the clutch mechanism and the continuously variable transmission when the vehicle speed is reduced below a predetermined value with fuel being cut off by the engine control device during vehicle speed reduction, it is possible in a power transmitting apparatus for a vehicle mounted with a torque converter and an idle-stop mechanism to improve fuel economy without cancelling the fuel-cut-off during vehicle speed reduction and to reduce the manufacturing cost by eliminating an electrically driven oil pump.

In some embodiments where the flow control device comprises a hydraulic valve mechanism having a first supply path configured to normally supply oil to the torque converter, a second supply path configured to limit or prevent the supply of oil, and a valve configured to open and close the first supply path by hydraulic pressure, it is possible instantly and smoothly switch between the condition in which the supply of oil to the torque converter is limited or prevented and the condition in which the supply of oil to the torque converter is not limited or prevented.

In some embodiments where the valve is normally urged in a direction for closing the first supply path, the supply of oil to the torque converter can be reliably limited or prevented regardless of the response of the valve when the vehicle speed is reduced below a predetermined value with fuel to the engine being cut off during the vehicle speed reduction.

In some embodiments wherein the power transmitting apparatus comprises an accumulator configured to accumulate the oil and is configured so that the oil accumulated in the accumulator is discharged therefrom to the clutch mechanism. and the continuously variable transmission when the vehicle speed is reduced below a predetermined value with fuel to the engine being cut off during vehicle speed reduction, oil can be supplied instantly and smoothly to the clutch mechanism and the CVT.

In some embodiments wherein the clutch mechanism comprises a first clutch device operated during forward vehicle operation and configured to transmit the driving power of the engine to the driving wheels via the power transmitting system of the torque converter and a second clutch device operated during forward vehicle operation and configured to transmit the driving power of the engine to the driving wheels without the power transmitting system of the torque converter, and the clutch control device is configured to selectively operate the first clutch device and the second clutch device in accordance with the vehicle condition to position them in either the first power transmitting condition or the second power transmitting condition, it is possible to avoid complication and increases in size of the power transmitting apparatus, to improve the starting performance due to the torque amplifying function of the torque converter, and to improve the power transmitting efficiency during the steady running of a vehicle. In embodiments where the clutch control device is also configured to operate only the second clutch device when the vehicle speed is reduced below a predetermined value with fuel to the engine being cut off during vehicle speed reduction, oil can be more reliably and smoothly supplied.

In some embodiments wherein the power transmitting apparatus further comprises a first driving shaft connected to the first clutch device and configured to be rotated by the driving power of the engine via the power transmitting system of the torque converter, and a second driving shaft connected to the second clutch device and configured to be rotated by the driving power of the engine without the power transmitting system of the torque converter, and the first and second driving shafts are arranged coaxially with each other, it is possible to reduce the whole size of the power transmitting apparatus as compared with the size of a power transmitting apparatus in which the first and second driving shafts extend linearly from each other.

In some embodiments wherein the clutch mechanism comprises a forward-operation clutch device operated during forward vehicle operation and configured to transmit the driving power of the engine to the driving wheels via the power transmitting system of the torque converter and a lock-up clutch device configured to transmit the driving power of the engine to the driving wheels without the power transmitting system of the torque converter, and the clutch control device is configured to selectively operate the forward-operation clutch device and the lock-up clutch device in accordance with the vehicle condition to position them in either the first power transmitting condition or the second power transmitting condition, it is possible to easily apply such a power transmitting apparatus to a vehicle mounted with a lock-up clutch device being comparatively in wide use.

In some embodiments where the engine control device prompts an idle-stop when the transmission ratio of the continuously variable transmission is a predetermined value or more, the appropriate driving power can be produced when restarting an engine after an idle-stop.

BRIEF DESCRIPTION OF THE DRAWINGS

FIG. 10 is a control mode table of a clutch control device of the power transmitting apparatus of FIG. 1.

DETAILED DESCRIPTION OF EXEMPLIFYING EMBODIMENTS

Figure 1:
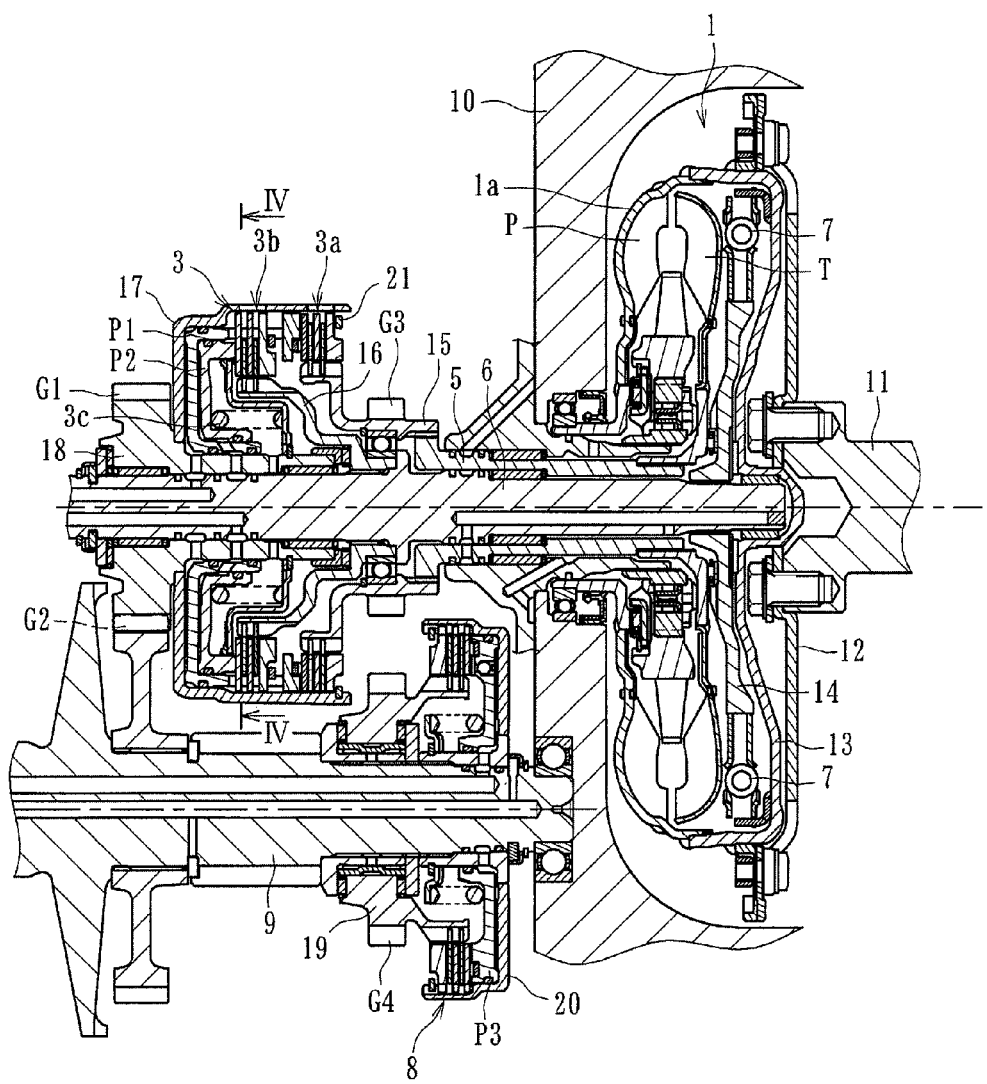
FIG. 1 is a longitudinal sectional view showing a power transmitting apparatus according to a first embodiment.

A first embodiment of a power transmitting apparatus can be configured to transmit or cut-off the driving force from an engine (driving source) of an automobile (vehicle) to or from the wheels (driving wheels). Such an apparatus can include, with reference to FIGS. 1 and 2, a torque converter 1, a clutch mechanism 3, an oil pump 31, a clutch control device 4, an engine control device 22, a flow control device 23, a first driving shaft 5, a second driving shaft 6, a damper mechanism 7, and a third clutch device 8, 8, and a variable speed unit A (continuously variable transmission (CVT) 25). FIG. 1 is a longitudinal-section view showing a main part of the power transmitting apparatus of the first embodiment, and FIG. 2 is a schematic diagram of the power transmitting apparatus of FIG. 1.

Figure 2:
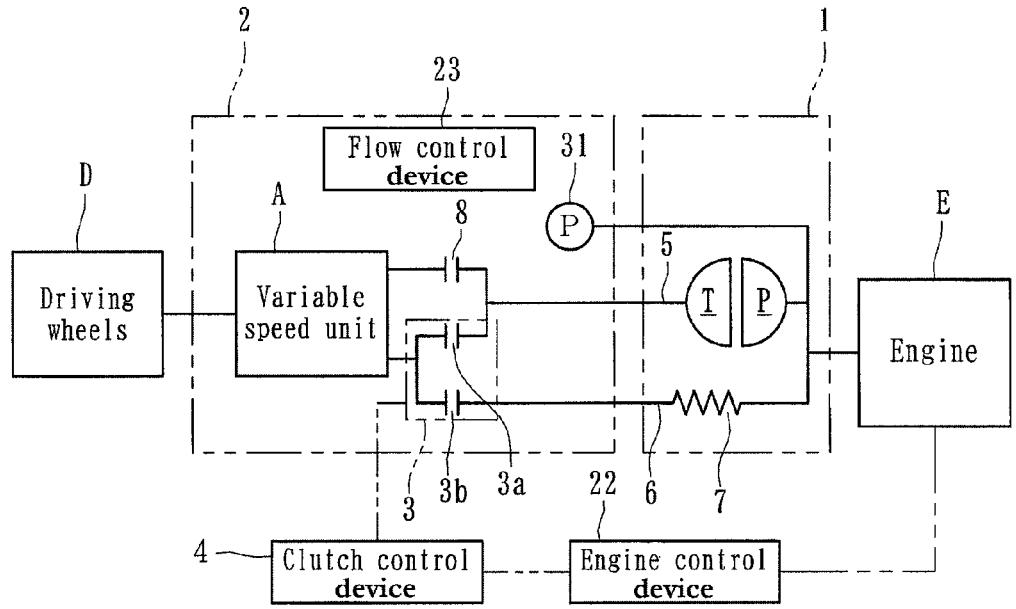
FIG. 2 is a schematic diagram of the power transmitting apparatus of FIG. 1.

As shown in FIG. 2, the torque converter 1 and a transmission 2 are configured to perform as a power transmitting system that transmits power from the engine E as the driving source of a vehicle to wheels (driving wheels D). The transmission 2 can include the clutch mechanism 3, the third clutch device 8, and the variable speed unit A. In FIG. 1 a reference numeral 11 denotes an input shaft extending from the engine E and a reference numeral 9 denotes an output shaft extending to the variable speed unit A.

The torque converter 1 can provide a torque amplifying function for amplifying the torque from the engine E and transmitting it to the transmission 2. The torque converter 1 is rotated around its shaft by the driving power transmitted from the engine E. The torque converter 1 can comprise torque converter covers 1a and 13 for containing oil (operating oil) in a fluid-tight manner. A pump P can be formed on the torque converter cover 1a and rotated together with the torque converter cover 1a. A turbine T can be arranged oppositely to the pump P and rotatable at a side of the torque converter cover 13.

The input shaft 11 can be connected to the torque converter cover 13 through a cover member 12. When the input shaft 11 is rotated by the driving power of the engine E, the cover member 12, the torque converter covers 13 and 1a, and the pump P are rotated. The rotational torque is thus transmitted to the turbine T through the oil (operating oil) with the torque being amplified. The turbine T is then rotated by the amplified torque and thus the amplified torque is transmitted to the transmission 2 through a first driving shaft 5 spline-fitted with the turbine T (first power transmitting condition). The term "power transmitting system of the torque converter" used herein means a power transmitting system formed by the torque converter cover 1a, the pump P, and turbine T. A reference numeral 10 in FIG. 1 denotes a transmission case.

On the other hand, the torque converter cover 13 can be connected to a connecting member 14 through the damper mechanism 7 comprising coil springs and the connecting member can be further spline-fitted with the outer circumferential surface of a second driving shaft 6. Accordingly, when the input shaft 11 is rotated by the driving power of the engine E, the cover member 12, the torque converter cover 13, the connecting member 14 and the second driving shaft 6 are rotated and thus the driving torque of the engine E is transmitted to the transmission 2. That is, the second driving shaft 6 can transmit the driving power to the transmission 2 without through the power transmitting system of the torque converter 1 (second power transmitting condition).

As described above, the first driving shaft 5 can be rotated by the driving power of the engine E through the power transmitting system of the torque converter 1 and can be connected to a first clutch device 3a, and the second driving shaft 6 can be directly rotated by the driving power of the engine E without through the power transmitting system of the converter 1 and can be connected to a second clutch device 3b. In addition, the first driving shaft 5 can be a hollow cylindrical member and the second driving shaft 6 can be rotationally arranged coaxially within the first driving shaft 5. Thus, the first driving shaft 5 can be rotatable around the second driving shaft 6 and, on the other hand, the second driving shaft 6 is rotatable within the first driving shaft 5. The first driving shaft 5 and the second driving shaft 6 can be independently rotated by properly selected operation of the clutch mechanism 3.

The clutch mechanism 3 can comprise the first clutch device 3a operable on advancement of an automobile (vehicle) and configured to transmit the driving power of the engine (driving source) E to the wheels (driving wheels D) through a power transmitting system of the torque converter 1 in a first power transmitting condition, and a second clutch device 3b configured to transmit the driving power of the engine E to the wheels D without through the power transmitting system of the torque converter 1 in a second power transmitting condition. The first and second clutch devices 3a and 3b respectively can comprise a plurality of driving clutch discs 3aa and 3ba and a plurality of driven clutch discs 3ab and 3bb slidable to right and left directions in drawings, and thus each form multiple disc clutches.

Figure 5:
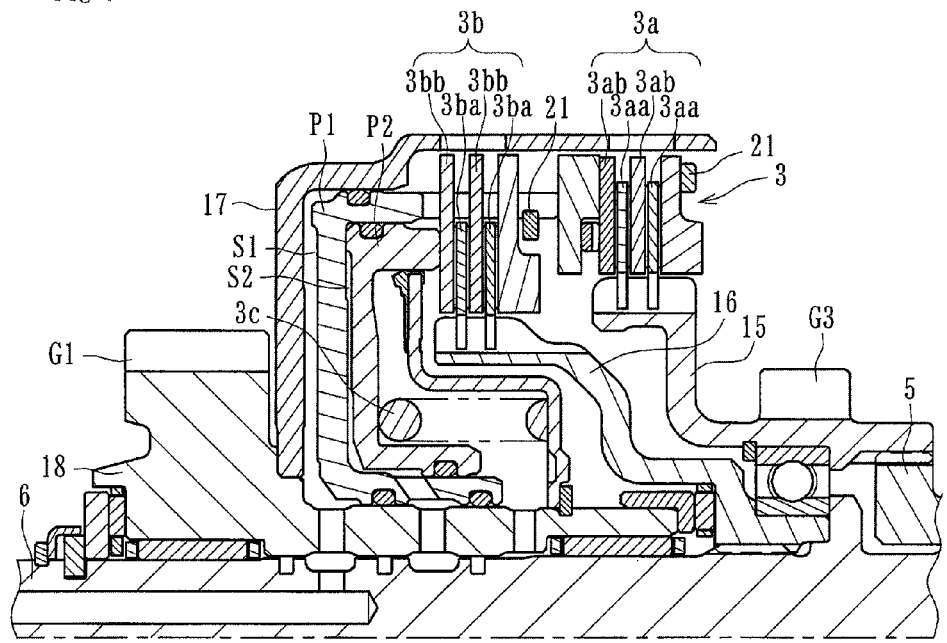
FIG. 5 is an enlarged view of the clutch mechanism of the power transmitting apparatus of FIG. 1 showing a condition in which only the first clutch device is activated.

In the first clutch device 3a, the driving clutch discs 3aa can be mounted on an interlocking member 15 connected to the first driving shaft 5 and interlocking therewith and the driven clutch discs 3ab can be mounted on a housing 17, and the driving clutch discs 3aa and the driven clutch discs 3ab can be alternately arranged with each other to form a laminated structure. These driving clutch discs 3aa and the driven clutch discs 3ab can be engaged and disengaged with each other. FIG. 5 shows a condition in which the first clutch device 3a is actuated and the driving clutch discs 3aa and the driven clutch discs 3ab are press-contacted with each other.

Figure 6:
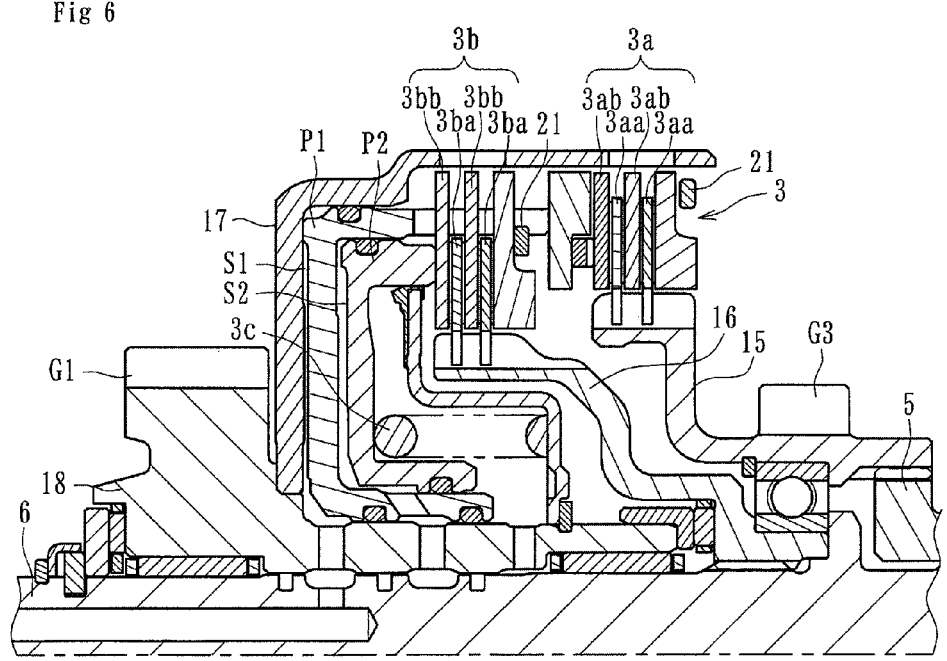
FIG. 6 is an enlarged view of the clutch mechanism of the power transmitting apparatus of FIG. 1 showing a condition in which only the second clutch device is activated.
Figure 7:
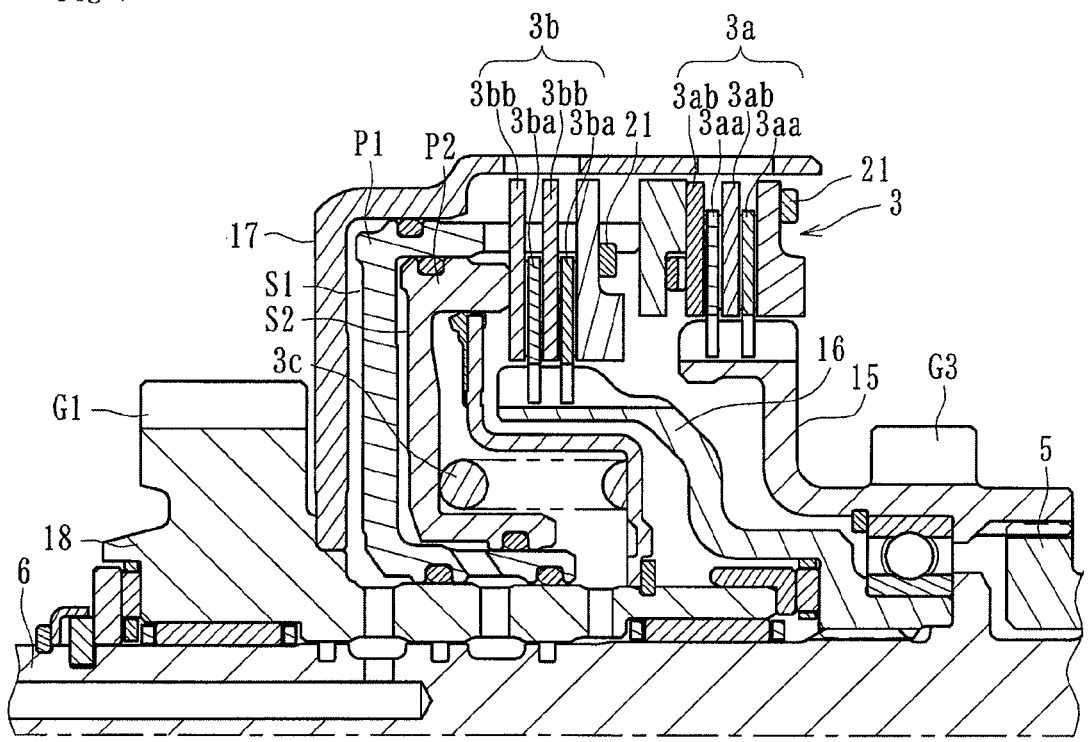
FIG. 7 is an enlarged view of the clutch mechanism of the power transmitting apparatus of FIG. 1 showing a condition in which both the first and second clutch devices are activated.

Meanwhile, in the second clutch device 3b, the driving clutch discs 3ba can be mounted on an interlocking member 16 connected to the second driving shaft 6 and interlocking therewith and the driven clutch discs 3bb can be mounted on the housing 17, and the driving clutch discs 3ba and the driven clutch discs 3bb can be alternately arranged with each other to form a laminated structure. These driving clutch discs 3ba and the driven clutch discs 3bb can be engaged and disengaged with each other. FIG. 6 shows a condition in which the second clutch device 3b is actuated and the driving clutch discs 3ba and the driven clutch discs 3bb are press-contacted with each other. The term "disengaged" used herein means a condition in which a pressure applied to the clutch discs is released while the clutch discs may remain in contact with each other, for example, while slipping. Thus, the term "disengaged" is not limited only to a physically disengaged condition. The transmission of driving power is allowed under the press-contacted condition and cut off under the disengaged condition.

Figure 3:
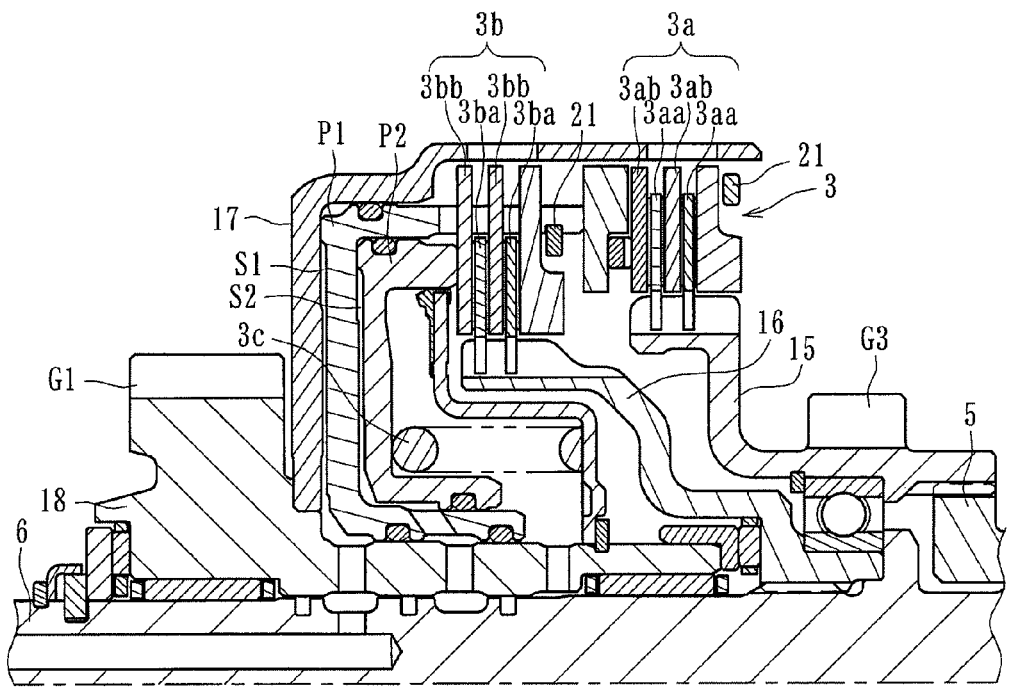
FIG. 3 is an enlarged cross-sectional view showing a clutch mechanism of the power transmitting apparatus of FIG. 1.

As shown in FIG. 3, the clutch mechanism 3 can comprise the first clutch device 3a, the second clutch device 3b, and two hydraulic pistons P1 and P2 corresponding respectively to the first and second clutch devices 3a and 3b contained in the same housing 17. The first and second clutch devices 3a and 3b can thus be selectively actuated by controlling the hydraulic pressure for actuating the hydraulic pistons P1 and P2.

Figure 4:
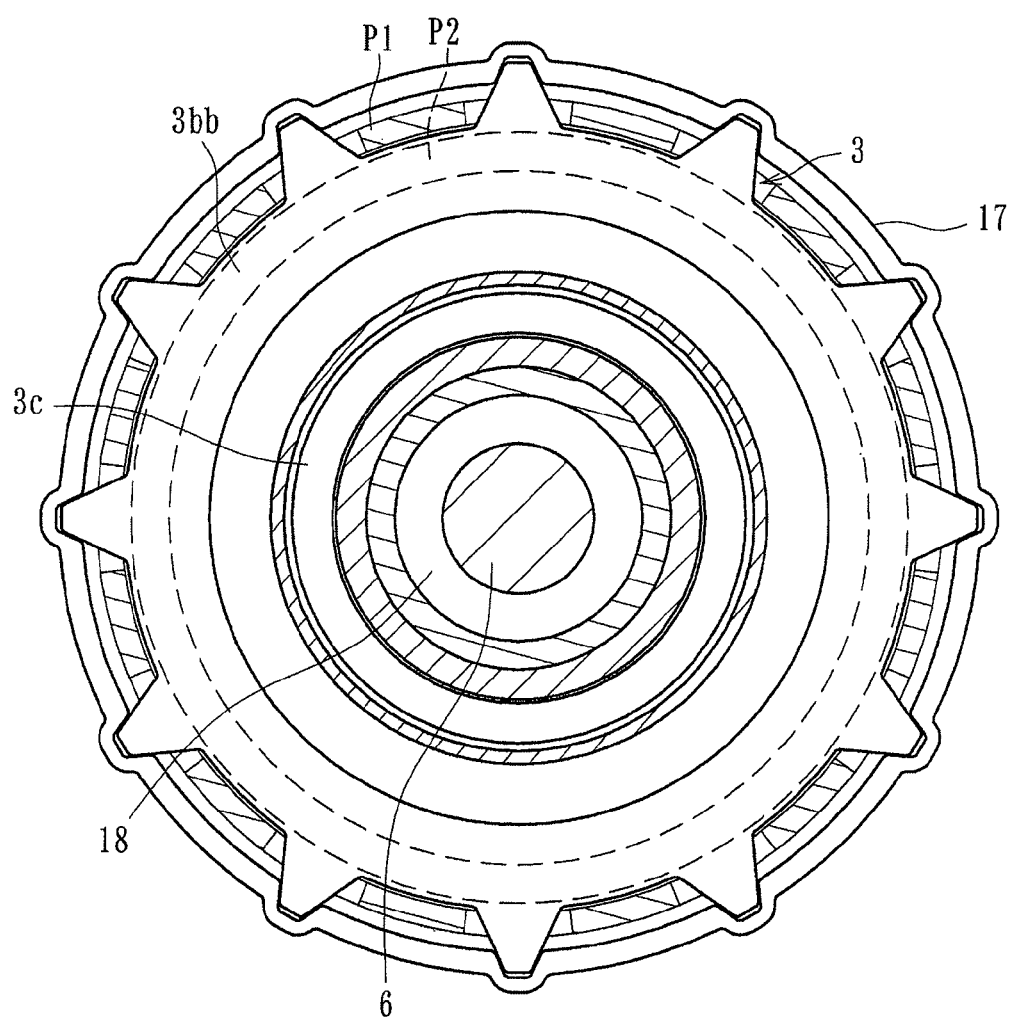
FIG. 4 is a cross-sectional view taken along a line IV-IV of FIG. 1.

For example, the hydraulic piston P1 can be moved toward the right in FIG. 3 against an urging force of a return spring 3c by supplying the operating oil into a hydraulic chamber S1 between the housing 17 and the hydraulic piston P1 and thus the first clutch device 3a is pressed by tips formed on the hydraulic piston P1 to press-contact the driving clutch discs 3aa and the driven clutch discs 3ab against each other. The tips formed on the hydraulic piston P1 can be passed through recesses formed on the peripheries of the driving clutch discs 3ba and the driven clutch discs 3bb of the second clutch device 3b as shown in FIG. 4.

The hydraulic piston P2 can be moved toward the right in FIG. 3 against an urging force of a return spring 3c by supplying the operating oil into a hydraulic chamber S2 between the hydraulic piston P1 and the hydraulic piston P2 and thus the second clutch device 3b is pressed by tips formed on the hydraulic piston P2 to press-contact the driving clutch discs 3ba and the driven clutch discs 3bb against each other. Thus the first clutch device 3a and the second clutch device 3b can be selectively actuated by controlling the hydraulic pressures operating the hydraulic pistons P1 and P2. In other words, the pistons P1 and P2 can change the first and second clutch devices between engaged and disengaged states. In FIG. 3 a reference numeral 21 denotes stoppers arranged at the sides of the first and second clutch devices 3a, 3b. Provision of the stopper 21 at the side of the second clutch 3b enables the second and first clutch devices 3b, 3a to be operated independently from each other.

The housing 17 forming part of the clutch mechanism 3 can be connected to an interlocking member 18 having formed thereon a gear G1 mating with a gear G2 formed on the output shaft 9. Thus, the driving power of the engine E transmitted through the first and second clutch devices 3a and 3b can be transmitted to the output shaft 9 through the housing 17 and the interlocking member 18.

The oil pump 31 can be driven by the driving power of the engine E to supply oil (operating oil) to the clutch mechanism 3 (first and second clutch devices 3a and 3b) and the torque converter 1 (and also to a continuously variable transmission (CVT) 25 described below) in order to operate the clutch mechanism 3 and the torque converter 1. The oil pump 31 can discharge oil using the driving power of the engine E and can be configured to be always operated during running of the engine E and stopped when the engine E is stopped.

The clutch control device 4 can be configured to selectively operate the hydraulic pistons P1, P2 by introducing operating oil into the hydraulic chambers S1, S2 in accordance with conditions (e.g. speed or inclination) of an automobile (a vehicle) to selectively operate the first clutch device 3a or the second clutch device 3b in order to transmit the driving power of the engine E to the driving wheels D via the power transmitting system of the torque converter 1 (first power transmitting condition) or without the power transmitting system of the torque converter 1 (second power transmitting condition).

On the other hand, the third clutch device 8 can comprise a multiple disc clutch and can be configured to transmit the driving power of the engine E to the driving wheels D via the power transmitting system of the torque converter 1 during reverse-direction operation of a vehicle. That is, the driving power of engine E can be transmitted to the third clutch device 8 with a gear G3 formed on an interlocking member 15 mated with a gear G4 formed on an interlocking member 19 of a side of output shaft 9 via an idle gear (not shown) arranged between them when a shift lever (not shown) of a vehicle is shifted to the "R" range (reverse position).

Similar to the first and second clutch devices 3a, 3b, the third clutch device 8 can have a housing 20 connected to the output shaft 9 and interlocked therewith. A hydraulic piston P3 and alternately arranged driving clutch discs 8a and driven clutch discs 8b can be arranged within the housing 20 so that mutually adjacent driving clutch discs 8a and driven clutch discs 8b are engaged and disengaged with each other by actuation of the hydraulic piston P3.

The engine control device 22 can be formed, for example, within an ECU (not shown) for controlling the engine E and can be configured to automatically stop the engine E to have an "idle-stop" condition when the speed of a vehicle is reduced below a predetermined value (e.g. a vehicle has reached a speed between a speed just before stop and a full stop) and to restart the engine E when a brake operation is released or an accelerator pedal is depressed. The engine control device 22 can be dedicated to control of the engine E relating to the idle-stop operation while the ECU generally controls operations of the engine E. In some embodiments, the engine E can be restarted after the idle-stop in other additional or different conditions, such as an increase of the vehicle speed etc. for example.

Where the power transmitting apparatus comprises the clutch control device 4 for transmitting the driving power of the engine E to the driving wheels D through the power transmitting system of the torque converter 1 or for transmitting the driving power of the engine E to the driving wheels D without the power transmitting system of the torque converter with proper selected operation of the first clutch device 3a or the second clutch device 3b in accordance with conditions of the vehicle, it is possible to avoid complication and increases in size of the apparatus, to improve the starting performance using the torque amplifying function of a torque converter, and to improve the power transmitting efficiency during steady running of a vehicle. Accordingly, in some embodiments it is possible to eliminate a lock-up clutch of the prior art.

Furthermore, since the first driving shaft 5 and the second driving shaft 6 are arranged coaxially with each other, it is possible to reduce a whole size of the power transmitting apparatus as compared with a configuration in which they are separately and linearly extended as in the prior art. In addition, since the second driving shaft 6 is connected to the engine E through a damper mechanism 7 for damping torque variation, it is possible to damp vibration of the engine E transmitted to the second clutch device 3b.

In addition, since the clutch mechanism 3 is configured so that the first and second clutch devices 3a, 3b and two hydraulic pistons P1, P2 corresponding to the first and second clutch devices 3a, 3b are contained within the same housing 17 and that the first and second clutch devices 3a, 3b can be selectively operated by controlling the hydraulic pistons P1, P2, it is possible to further reduce the size and simplify the structure of whole the power transmitting apparatus.

Figure 8:
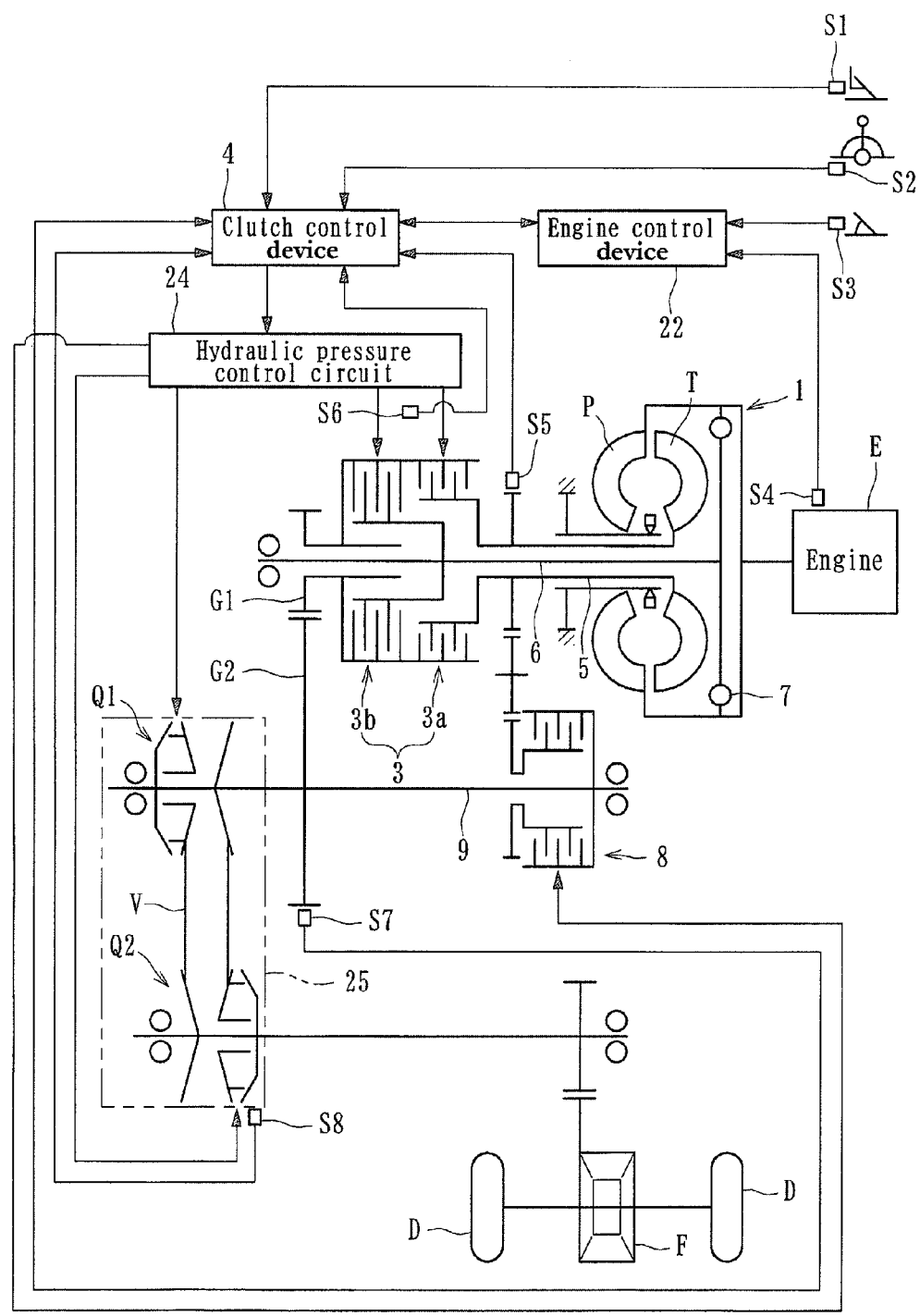
FIG. 8 is a schematic diagram of a power transmitting apparatus including a variable speed unit A.

The variable speed unit A can be a continuously variable transmission (CVT) 25. More particularly, as shown in FIG. 8, the CVT 25 can be operatively positioned between the second clutch device 3b of the clutch mechanism 3 and the driving wheels D in the power transmitting system to transmit power from the engine E to the driving wheels D.

Such a CVT 25 can comprise two pulleys Q1, Q2 and a belt V extending therebetween and can achieve a desired speed by independently shifting movable sheaves and changing diameters of the pulleys Q1, Q2 on which the belt V runs by a hydraulic pressure control circuit 24. The CVT 25 can be supplied with operating oil from the oil pump 31 to shift the movable sheaves of the pulleys Q1, Q2. The clutch control device 4 can be electrically connected with a brake switch S1, a position sensor S2 and engine control device 22 etc. The CVT 25 can be controlled by the clutch control device 4 via the hydraulic pressure control circuit 24. A reference character S3 denotes a throttle opening sensor of the accelerator pedal.

Since the CVT 25 is operatively positioned between the second clutch device 3b of the clutch mechanism 3 and the driving wheels D in the power transmitting system to transmit power from the engine E of the vehicle to the driving wheels D, a clutch used for advancing a vehicle and a clutch for transmitting the driving power of the engine E to the driving wheels D without the power transmitting system of the torque converter 1 can be combined in the second clutch device 3b.

A reference character F denotes a differential gear of a vehicle. A reference character S4 denotes an engine speed sensor configured to detect the rotational speed of the engine E. A reference character S5 denotes a speed sensor configured to detect the rotational speed of the first driving shaft 5. A reference character S6 denotes a oil pressure switch configured to detect the hydraulic pressure of the clutch mechanism 3 (the second clutch device 3b in this embodiment). A reference character S7 denotes a secondary shaft speed sensor. A reference character S8 denotes a counter shaft speed sensor.

Figure 9:
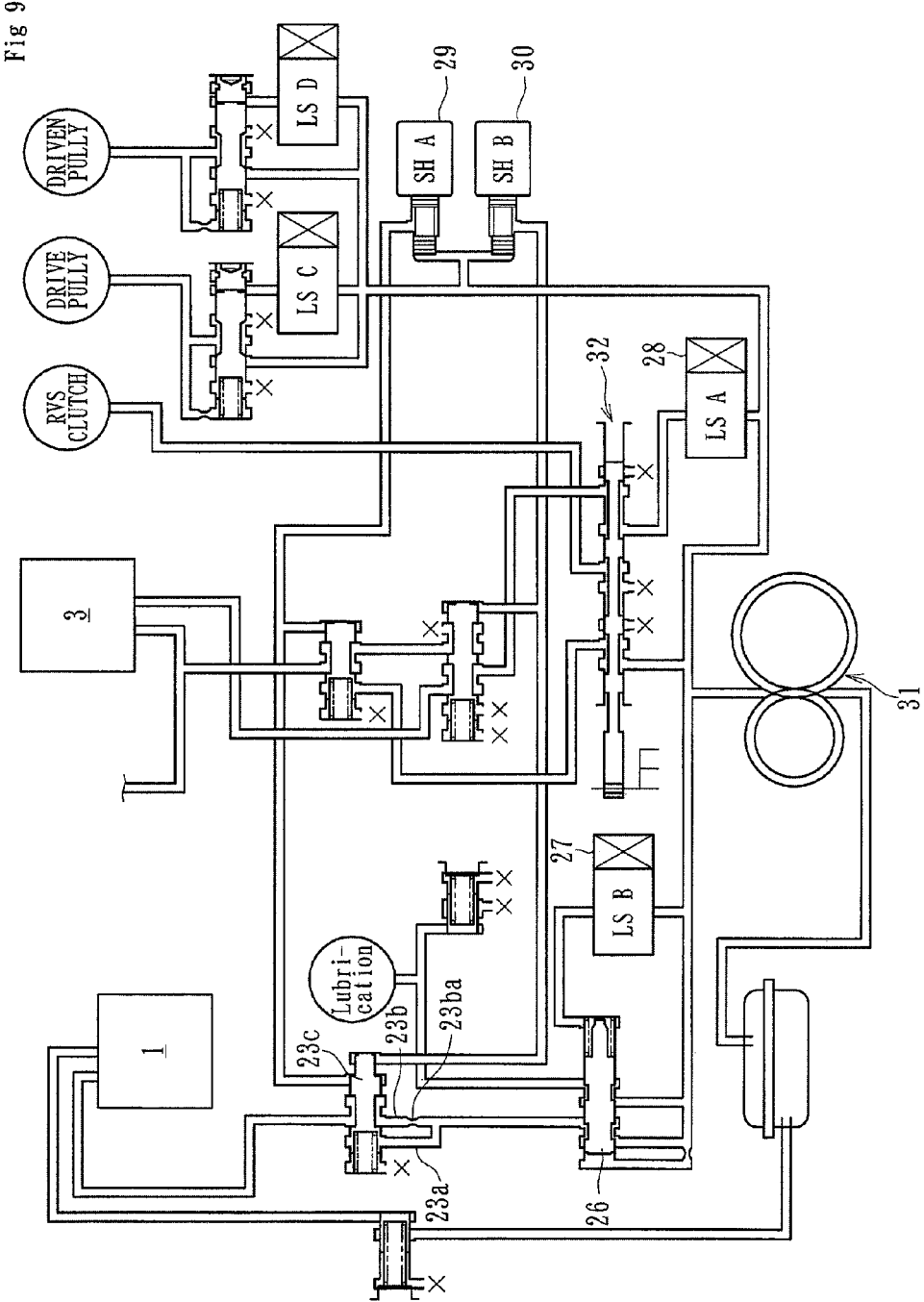
FIG. 9 is a block diagram showing a hydraulic pressure control circuit of the power transmitting apparatus of FIG. 1.

As shown in FIG. 9, the hydraulic pressure control circuit 24 can comprise oil paths and valves connecting the oil pump 31 and objects to be supplied with oil (e.g. the torque converter 1, the clutch mechanism 3, etc.) and solenoids for opening and closing the valves. A reference numeral 26 denotes a regulator valve for controlling the line pressure. A reference numeral 27 denotes a linear solenoid (LS B) for controlling the pressure of the regulator 26. A reference numeral 28 denotes a linear solenoid (LS A) for controlling the clutch pressure. A reference numeral 32 denotes a manual valve for switching the oil paths in accordance with the shift ranges (P, R, N, D) of the variable speed unit. The linear solenoid (LS A) 28 can control the clutch pressure for the clutch mechanism 3 in the D range and the clutch pressure for a "RVS CLUTCH" in the R range. The linear solenoid (LS B) 27 can control the line pressure controlled by the regular valve.

As shown in this embodiment, a flow control device 23 can be positioned in an oil path from the oil pump 31 to the torque converter 1. The flow control device 23 can be configured to limit the supply of oil to the torque converter 1 by the oil pump 31 and to prioritize the supply of oil to the clutch mechanism 3 and the continuously variable transmission (CVT) 25 when the vehicle speed is reduced below a predetermined value under a fuel-cut-off condition (fuel supply is stopped) of the engine during vehicle speed reduction.

More particularly, the flow control device 23 can comprise a hydraulic valve mechanism having a first supply path 23a for normally supplying oil to the torque converter 1, a second supply path 23b in which an orifice 23ba for limiting the supply of oil is formed, and a valve 23c for opening and closing the first supply path 23a by hydraulic pressure. The valve 23c can be opened and closed by a solenoid (SH A) 29 and a solenoid (SH B) 30. The valve 23c of the flow control device 23 of this embodiment can be normally urged by a spring in a direction that would close the first supply path 23a. Although in this embodiment the oil supply to the torque converter 1 by the oil pump 31 is limited by the flow control device 23 when vehicle speed is reduced below a predetermined value with fuel to the engine E being cut off during vehicle speed reduction, the supply of oil to the clutch mechanism 3 (the second clutch device 3b in this embodiment) and the CVT 25 can be prioritized by preventing supply of any oil to the torque converter 1.

As shown in FIG. 10, the clutch control device 4 can be configured so that the hydraulic pressure valve mechanism forming the flow control device 23 can be selectively operated by controlling the solenoid (SH A) 29 and the solenoid (SH B) 30 in accordance with set modes. In FIG. 10 marks "o" denote that the solenoid is electrically "ON" and marks "x" denote that solenoid is electrically "OFF." In addition, a term "Line Pressure" denotes that the line pressure is directly inputted to the clutch mechanism 3 and a term "Linear solenoid A" denotes that the linear solenoid valve (LS A) 28 controls the clutch pressure.

Figure 11:
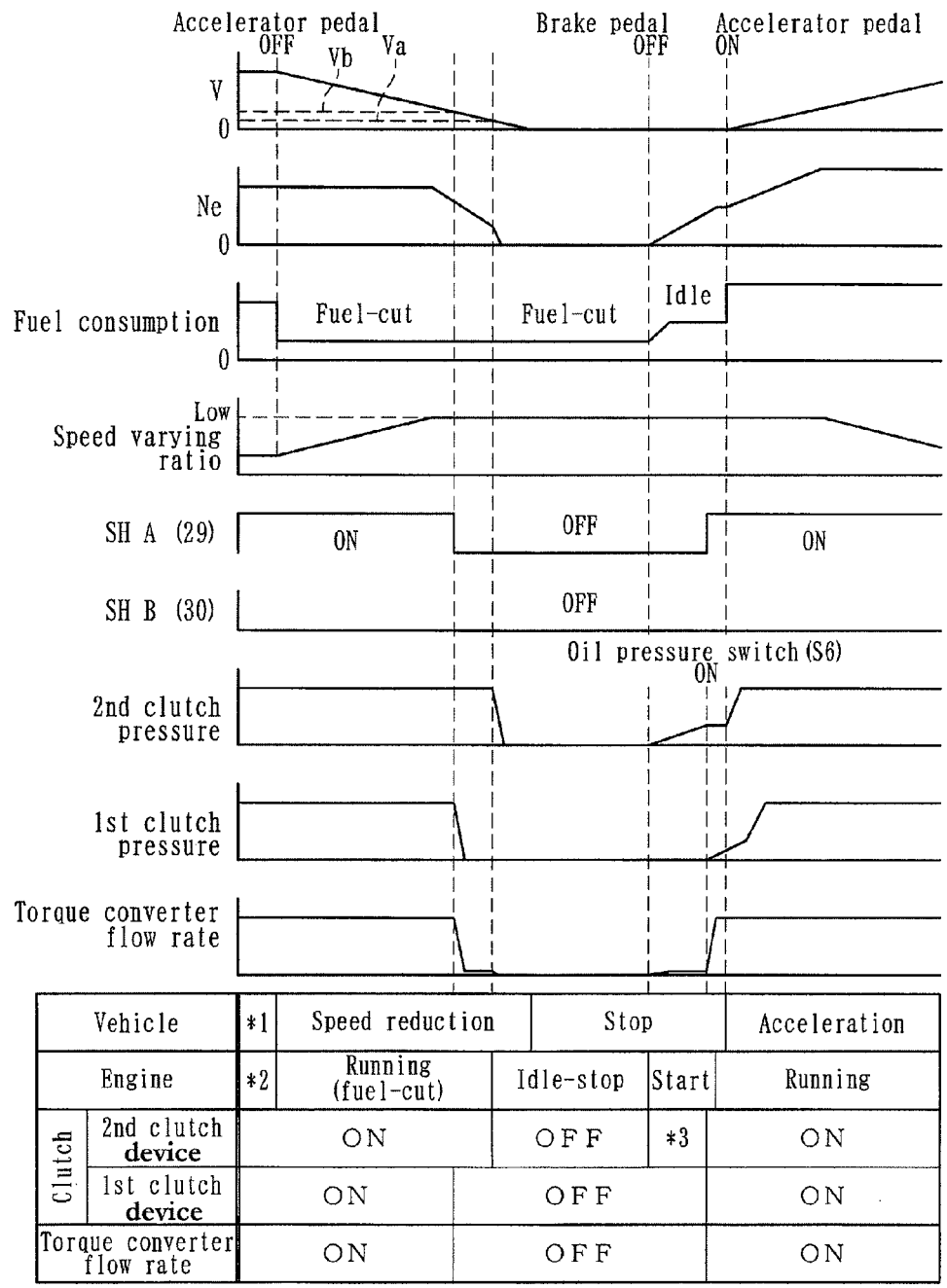
FIG. 11 is a time chart of the power transmitting apparatus of FIG. 1.

FIG. 11 is a time chart illustrating control by the clutch control device 4 in speed reduction, stop, and acceleration processes. This time chart indicates that the supply of oil to the clutch mechanism 3 and the CVT 25 is prioritized by limiting supply of oil by the oil pump 31 to the torque converter 1 when vehicle speed is reduced below a predetermined value (a second vehicle speed Vb in FIG. 11) with fuel to the engine E being cut off during vehicle speed reduction.

In some embodiments, such as in this embodiment, the clutch control device 4 can be configured to actuate only the second clutch device 3b when a vehicle speed is reduced below a predetermined value (a second vehicle speed Vb in FIG. 11) with fuel to the engine E being cut off during vehicle speed reduction. In addition, when the vehicle speed is further reduced to a predetermined value (a first vehicle speed Va in FIG. 11), operation of the second clutch device 3b is stopped at the same time as the engine is idle-stopped. Since the clutch control device 4 actuates only the second clutch device 3b when a vehicle speed is reduced below a predetermined value (a second vehicle speed Vb in FIG. 11) with fuel to the engine E being cut off during vehicle speed reduction, oil can be supplied more reliably and smoothly than a configuration in which both the first and second clutch devices 3a, 3b are supplied with oil.

Furthermore, the engine control device 22 performs an idle-stop when the transmission ratio of the CVT 25 is a predetermined value (transmission ratio necessary for beginning of vehicle movement) or more. Thus, driving power for initiating vehicle movement at the restart of the engine after the idle-stop can be reliably provided.

Figure 12:
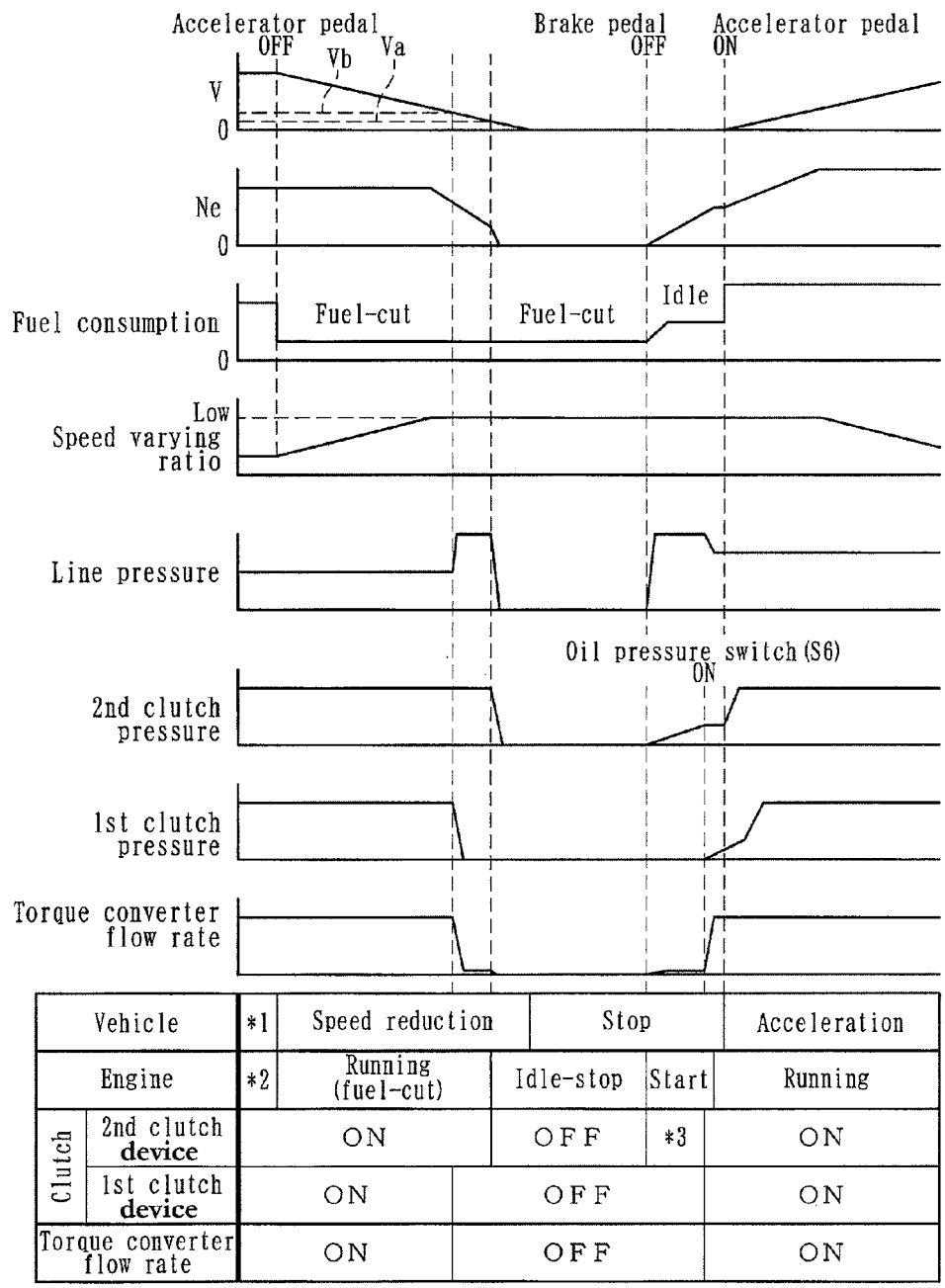
FIG. 12 is another time chart of the power transmitting apparatus of FIG. 1.

Instead of using the flow control device 23, a line pressure regulated by the regulator valve 26 can be increased as shown in FIG. 12 by controlling the linear solenoid valve (LS B) 27 between the second vehicle speed Vb and the first vehicle speed Va. Also, in this case it is preferable to control the regulator valve 26 so that the line pressure is returned to an ordinary value when a vehicle reach the first vehicle speed Va and become the idle-stop condition (see line pressure setting illustrated in FIG. 12).

Figure 13:
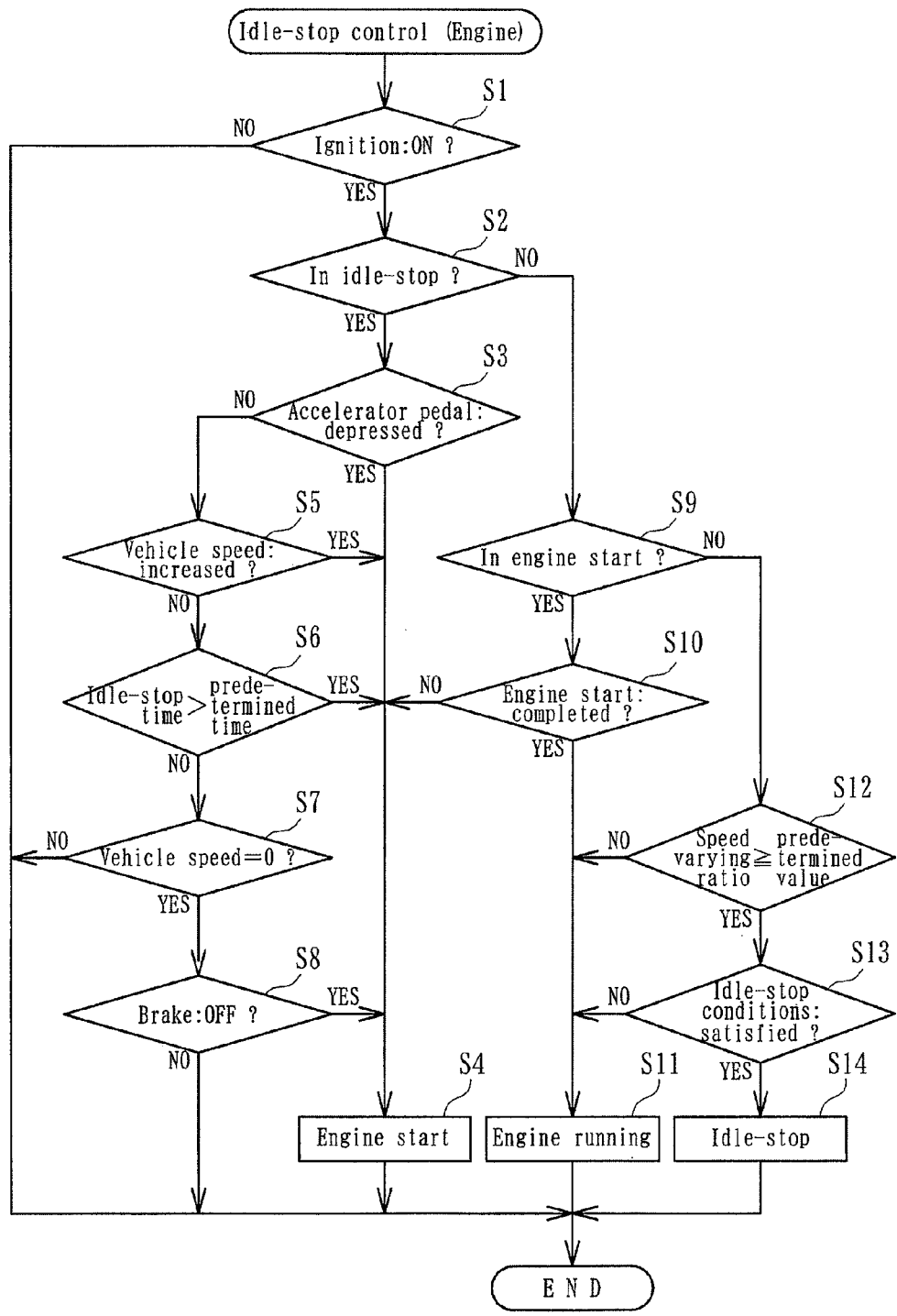
FIG. 13 is a flowchart illustrating a control routine of an engine control device of the power transmitting apparatus of FIG. 1.

A control method of the engine control device 22 is described with reference to a flowchart shown in FIG. 13. At S1, it is determined whether or not the ignition is "ON." If "ON", the method proceeds to S2 and determines whether or not it is in idle-stop. If determined to be in idle-stop, it is determined in S3 whether or not the accelerator pedal is depressed. If determined to be depressed, the method proceeds to S4 and the engine is restarted.

On the other hand, if determined in S3 that the accelerator pedal is not depressed yet, the method goes to S5 and determines whether the vehicle speed has been increased. If the vehicle speed has been increased, the method goes to S4 and the engine is restarted. On the contrary, if the vehicle speed has not been increased, the method goes to S6 and determines whether a predetermined duration of the idle-stop has lapsed. If the predetermined duration of the idle-stop has lapsed in S6, the method goes to S4 and the engine is restarted. On the contrary, if the predetermined duration of the idle-stop has not lapsed, the method goes to S7 and determines whether the vehicle speed is "0" (i.e. stopped) or not. If determined in S7 that the vehicle speed is "0", the method goes to S8 and determines whether the brake is "OFF" or not. If the brake is "OFF", the method goes to S4 and the engine is restarted.

If it is determined in S2 that it is not in idle-stop, the method goes to S9 and determines whether it is in the restart of the engine or not. If it is determined that it is in the restart of the engine, the method goes to S10 and determines whether the restart of the engine has been completed. If it is determined that the restart of the engine has been completed, the method goes to S11 and engine operation (engine running or engine driving) is performed. On the contrary, if it is determined that the restart of the engine has not been completed, the method goes to S4 and the engine is restarted.

If it is determined in S9 that it is not in the restart of the engine (i.e. in engine running), the method goes to S12 and determines whether or not the transmission ratio (effective gear ratio) of the continuously variable transmission (CVT) 25 is a predetermined value or greater value. If determined that the transmission ratio of the CVT 25 is a predetermined value or greater value, the method goes to S13 and determines whether that the idle-stop conditions (e.g. the vehicle speed is a predetermined value or less, the temperatures of water and oil are predetermined values or more, no trouble, etc.) are satisfied or not. If the transmission ratio of the CVT 25 is not a predetermined value or greater value, the method goes to S11 and the engine operation (engine running or engine driving) is performed. If it is determined in S13 that the idle-stop conditions are satisfied, the method goes to S14 and the idle-stop condition is implemented.

Figure 14:
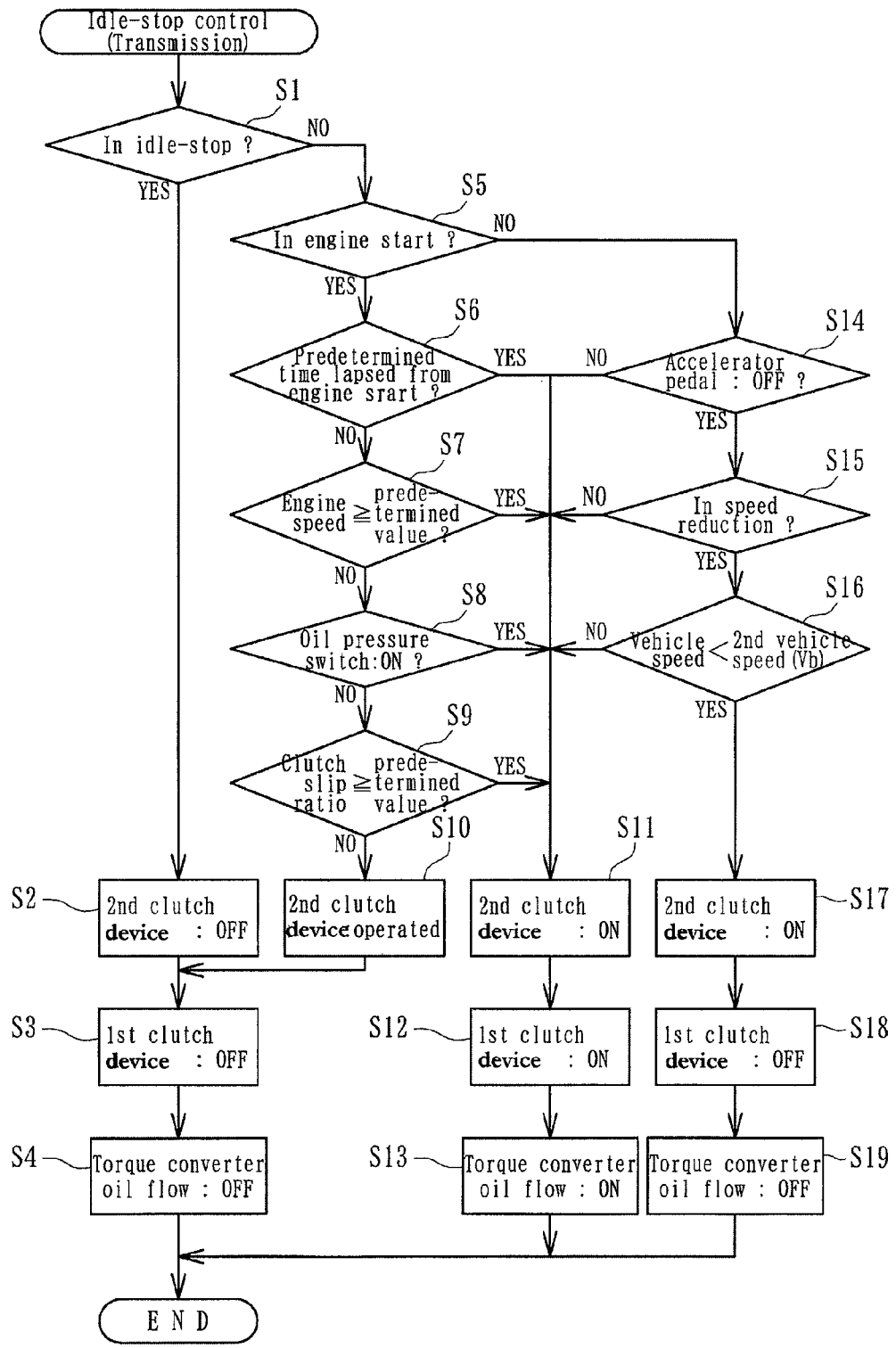
FIG. 14 is a flowchart illustrating a control routine of a clutch control device of the power transmitting apparatus of FIG. 1.

A control method of the clutch control device 4 is described with reference to a flowchart shown in FIG. 14.

First, it is determined in S1 whether the engine is in the idle-stop or not. If it is in the idle-stop, the second clutch device 3b is made "OFF" (S2), the first clutch device 3a is made "OFF" (S3), and the supply of oil to the torque converter 1 is also made "OFF" (S4). On the contrary, if it is determined in S1 that the engine is not in the idle-stop, the method goes to S5 and determined whether it is in the restart of the engine or not. If it is in the restart of the engine, the method goes to S6 and determined whether a predetermined time has lapsed from the restart of the engine.

If it is determined in S6 that the predetermined time has not lapsed from the restart of the engine, the method goes to S7 and determines whether or not the engine speed is a predetermined value or greater value. If the engine speed is not the predetermined value or greater value, the method goes to S8 and determines whether the oil pressure switch S6 (detecting device) is "ON" or not. If the oil pressure switch S6 is not "ON", the method goes to S9 and determines whether or not the clutch slip ratio is a predetermined value or greater value. If the clutch slip ratio is not the predetermined value or greater value, the method goes to S10 and actuates the second clutch device 3b. After the second clutch device 3b is actuated in S10, the method goes to S3 and S4.

On the contrary, if it is determined in S6 that the predetermined time has lapsed from the restart of the engine, or if it is determined in S7 that the engine speed is the predetermined value or greater value, or if it is determined in S8 that the oil pressure switch S6 (detecting device) is "ON", or if it is determined in S9 that the clutch slip ratio is a predetermined value or greater value, the method goes to S11 and actuates the second clutch device 3b. Then after it actuates the first clutch device 3a in S12, supply of hydraulic oil to the torque converter 1 is made "ON" in S13.

If it is determined in S5 that it is not in the restart of the engine (i.e. in engine running), the method goes to S14 and determines whether the accelerator pedal is "OFF" or not. If the accelerator pedal is "OFF", the method goes to S15 and determines whether it is in speed reduction or not. If it is determined in step S15 that it is in the speed reduction, the method goes to S16 and determines whether the vehicle speed is slower than a predetermined value (second speed Vb) or not. If the vehicle speed is lower than the second speed Vb, the second clutch device 3b is made "ON" in 517, the first clutch device 3a is made "OFF" in S18, and the supply of operating oil to the torque converter 1 is made "OFF" in S19. In addition, if it is determined in S14 that the accelerator pedal is not "OFF" (i.e. is "ON"), in S15 that it is not in the speed reduction, and in S16 that the vehicle speed is not lower (i.e. is higher) than the predetermined value (second speed Vb), it goes to S11 and then S12 and S13 after the second clutch device 3b has been actuated.

In some embodiments, such as this embodiment, where the power transmitting apparatus comprises a flow control device configured to limit or prevent the supply of oil to the torque converter 1 by the oil pump 31 and to prioritize the supply of oil to the clutch mechanism 3 (second clutch device 3b) and the continuously variable transmission (CVT) 25 when the vehicle speed is reduced below a predetermined value (second vehicle speed Vb) with fuel being cut off by the engine control device during vehicle speed reduction, it is possible in a power transmitting apparatus for a vehicle mounted with a torque converter 1 and an idle-stop mechanism to improve fuel economy without cancelling the fuel-cut-off during vehicle speed reduction and to reduce the manufacturing cost by eliminating an electrically driven oil pump.

In addition, where the flow control device 23 comprises a hydraulic valve mechanism having a first supplying path 23a configured to normally supplying oil to the torque converter, a second supplying path 23b configured to limit or prevent the supply of oil, and a valve 23c configured to open and close the first supply path 23a by hydraulic pressure, it is possible instantly and smoothly switch between the condition in which the supply of oil to the torque converter 1 is limited or prevented and the condition in which the supply of oil to the torque converter 1 is not limited or prevented. Furthermore, where the valve 23c is normally urged by a spring in a direction for closing the first supplying path 23a, the supply of oil to the torque converter can be reliably limited or prevented regardless of the set operation pressure of the valve 23c even though the control pressure has been reduced because of reduced pump rotation when the vehicle speed is reduced below a predetermined value (second vehicle speed Vb) in a fuel-cut-off condition.

A second embodiment of a power transmitting apparatus, like the first embodiment, can be configured to transmit or cut-off the driving force from an engine (driving source) of an automobile (vehicle) to or from the wheels (driving wheels). Such an apparatus can include, with reference to FIGS. 1 and 2, a torque converter 1, a clutch mechanism 3, an oil pump 31, a clutch control device 4, a engine control device 22, a flow control device 23, a first driving shaft 5, a second driving shaft 6, a damper mechanism 7, and a third clutch device 8, and a variable speed unit A (continuously variable transmission (CVT) 25). The same reference numerals are used to designate structural elements in this embodiment as those used to designate similar structural elements in the first embodiment and therefore detailed description of them is not repeated.

Figure 15:
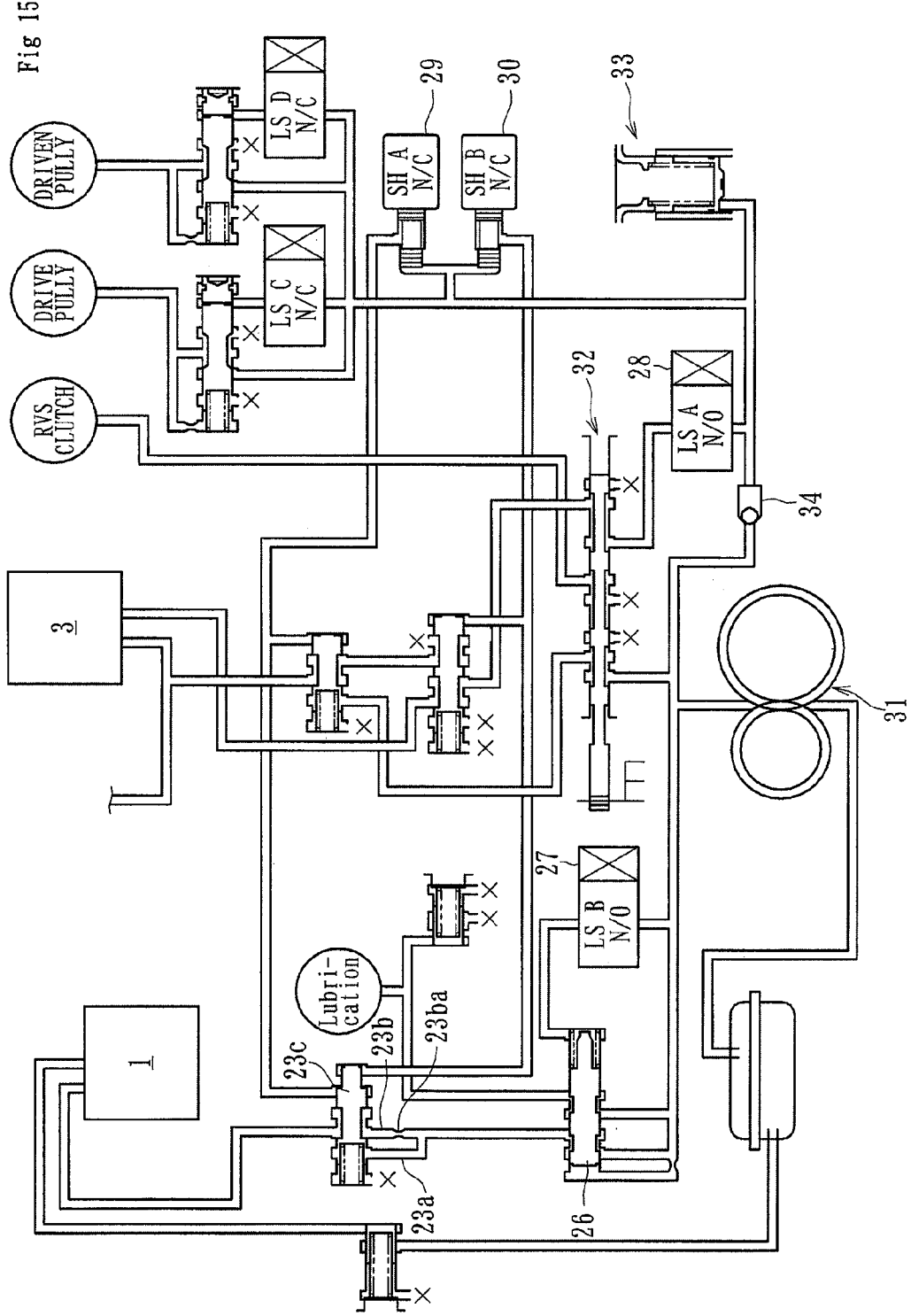
FIG. 15 is a block diagram showing a hydraulic pressure control circuit of a power transmitting apparatus of a second embodiment.

In this second embodiment, an accumulator 33 can be operatively positioned on an oil supply path of the clutch mechanism 3 from the oil pump 31 as shown in FIG. 15. The accumulator 33 can be configured to accumulate the oil and can be configured so that the oil accumulated in the accumulator 33 is discharged therefrom to the clutch mechanism 3 (second clutch device 3b in this embodiment) and the continuously variable transmission (CVT) 25 when the vehicle speed is reduced below a predetermined value (second vehicle speed Vb) with fuel to the engine E being cut off during vehicle speed reduction. The provision of the accumulator 33 enables the oil supply to the clutch mechanism 3 and the CVT 25 to be more reliable and smooth. A reference numeral 34 in FIG. 15 denotes a check valve.

Figure 16:
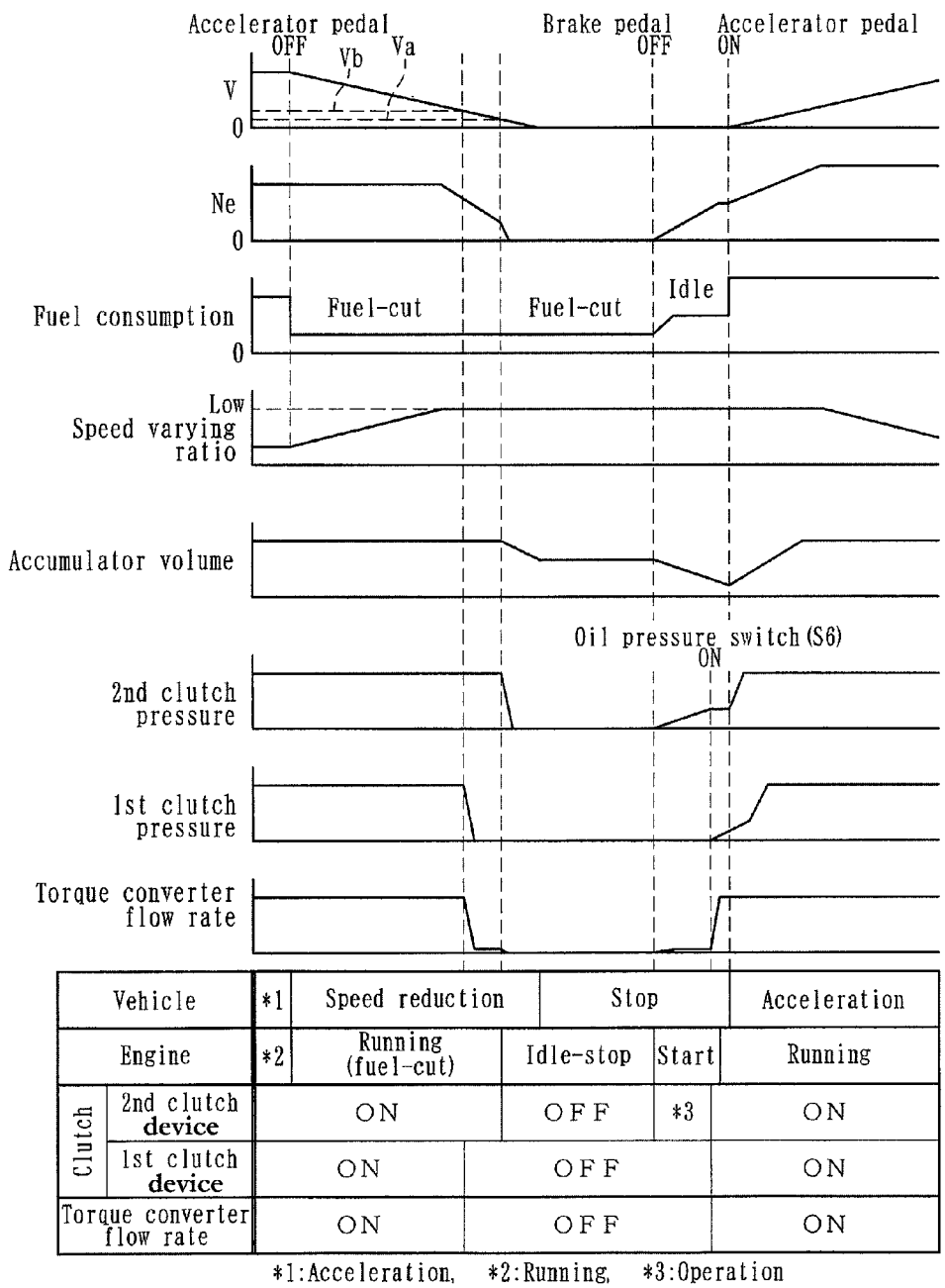
FIG. 16 is a time chart of the power transmitting apparatus of FIG. 15.

The timing of discharging the oil accumulated in the accumulator 33 is not limited only to that at which the vehicle speed is reduced to a predetermined value (second vehicle speed Vb) but also can be at times when the vehicle speed is reduced to the first vehicle speed Va or less (after beginning the idle-stop) as shown in a time chart of FIG. 16. In this case it is preferable to control the CVT 25 so that its transmission ratio is kept constant. This reduces the need for pressure accumulation and, thus, allows the capacity of the accumulator 33 to be reduced. In addition, in this embodiment, the supply of oil to the clutch mechanism 3 can be prioritized by actuating the flow control device 23 through ON/OFF control of the solenoid (SH A) 29 and the solenoid (SH B) 30 and limiting the oil supply rate by the oil pump 31 to the torque converter 1 on restart of the engine E after the idle-stop.

Other configurations of the accumulator 33 can be used if it is connected operatively on the oil supply path of the clutch mechanism 3 from the oil pump 31 and the accumulated oil can be supplied to the clutch mechanism 3 and the CVT 25 by discharging it from the accumulator 33 when the vehicle speed is reduced to the predetermined value (second vehicle speed Vb) or less with fuel to the engine E being cut off during vehicle speed reduction.

Figure 17:
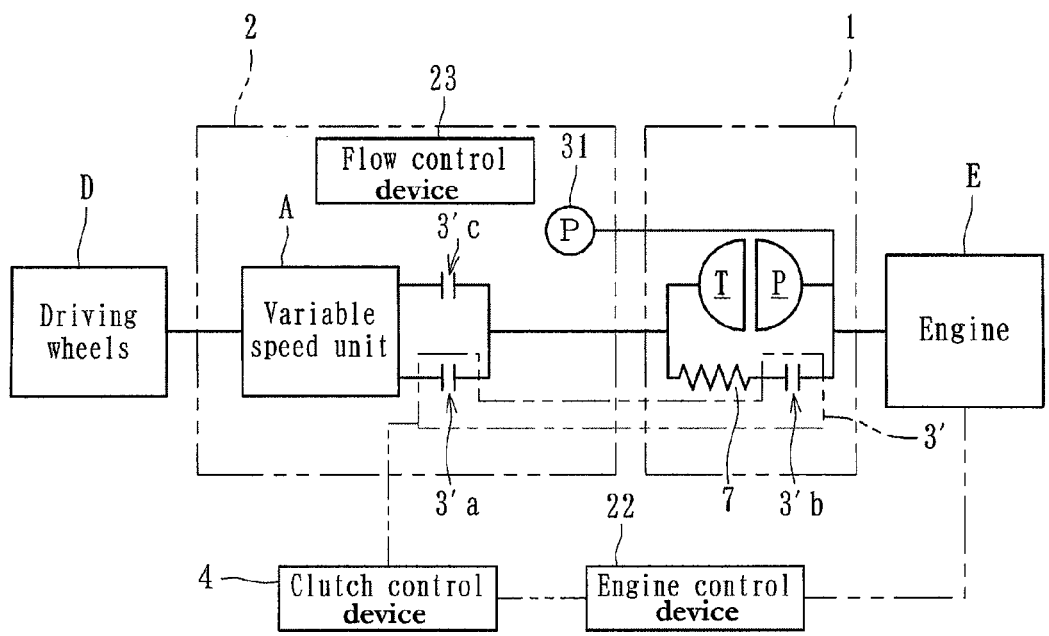
FIG. 17 is a schematic diagram of a power transmitting apparatus of a third embodiment.

A third embodiment of a power transmitting apparatus, like the first and second embodiments, can be configured to transmit or cut-off the driving force from an engine (driving source) of an automobile (vehicle) to or from the wheels (driving wheels). Such an apparatus can include, with reference to FIG. 17, a torque converter 1, a clutch mechanism 3', an oil pump 31, a clutch control device 4, a engine control device 22, a flow control device 23, a damper mechanism 7, and a reverse clutch device 3'c, and a variable speed unit A (continuously variable transmission (CVT) 25). The same reference numerals are used to designate structural elements in this embodiment as those used to designate similar structural elements in the first and second embodiments and therefore detailed description of them is not repeated.

The clutch mechanism 3' can comprise a forward-operation clutch device 3'a operated during forward vehicle operation and configured to transmit the driving power of the engine E to the driving wheels D via the power transmitting system of the torque converter 1 (the first power transmitting condition) and a lock-up clutch device 3'b configured to transmit the driving power of the engine E to the driving wheels D without the power transmitting system of the torque converter 1 (the second power transmitting condition), and the clutch control device 4 is configured to selectively operate the forward-operation clutch device 3'a and the lock-up clutch device 3'b in accordance with a condition of a vehicle to position them in either the first power transmitting condition or the second power transmitting condition.

The lock-up clutch device 3'b can be arranged within the torque converter 1 and can be configured to be connected to the turbine T of the torque converter 1 so that the torque converter cover and the turbine are directly connected via a clutch piston. The power transmitting apparatus of this third embodiment can be easily applied to a vehicle mounted with a lock-up clutch device (lock-up clutch) being comparatively in wide use.

The power transmitting apparatus of the present inventions have been described with reference to exemplifying embodiments. However, the present inventions are not limited to these illustrated embodiments and the clutch devices can be formed in other configurations.

What is claimed is:
1. A power transmitting apparatus, comprising:
a torque converter having a torque amplifying function;
a clutch mechanism configured to be positioned in a first power transmitting condition in which driving power of an engine is transmitted to driving wheels of a vehicle via a power transmitting system of the torque converter and a second power transmitting condition in which the driving power of the engine is transmitted to the wheels without the power transmitting system of the torque converter;

an oil pump driven by the driving power of the engine to supply oil to the clutch mechanism and the torque converter to operate them;

a continuously variable transmission supplied with oil by the oil pump to actuate pulleys by hydraulic pressure of the oil to continuously vary a transmission ratio of the continuously variable transmission;

a clutch control device configured to selectively operate the clutch mechanism in accordance with a vehicle condition to position the clutch mechanism in either the first power transmitting condition or the second power transmitting condition; and an engine control device configured to idle-stop the engine by automatically stopping the engine when vehicle speed is above zero and below a predetermined value and to restart the engine when an accelerator pedal is depressed or brakes are released during an idle-stop condition of the engine.

2. The power transmitting apparatus of claim 1, wherein the engine control device is configured to automatically stop the engine when the vehicle speed is reduced to a predetermined value while the vehicle is slowing down.

3. The power transmitting apparatus of claim 1, wherein the engine control device is configured to idle-stop the engine when the transmission ratio of the continuously variable transmission is a predetermined value or more.

4. The power transmitting apparatus of claim 1, wherein the engine control device is configured to idle-stop the engine when both a water temperature and an oil temperature are predetermined values or more.

5. The power transmitting apparatus of claim 1, wherein the engine control is configured to restart the engine when a predetermined duration of time of the idle-stop condition has lapsed.

6. The power transmitting apparatus of claim 1, wherein the torque converter comprises a pump, a turbine, and an output shaft connected to the turbine, wherein the clutch mechanism is connected operatively between the output shaft of the torque converter and the driving wheels and is configured such that, when the clutch mechanism is in the second power transmitting condition, the driving power of the engine is transmitted to the driving wheels without passing through the output shaft of the torque converter.

7. The power transmitting apparatus of claim 1, wherein the torque converter comprises a pump and a turbine, and wherein the power transmitting apparatus further comprises an output shaft connected to the pump, wherein the clutch mechanism is connected operatively between the output shaft and the driving wheels and is configured such that, when the clutch mechanism is in the second power transmitting condition, the driving power of the engine is transmitted to the driving wheels via the output shaft of the pump.

8. A power transmitting apparatus, comprising:
a torque converter having a torque amplifying function;
a clutch mechanism configured to be positioned in a first power transmitting condition in which driving power of an engine is transmitted to driving wheels of a vehicle via a power transmitting system of the torque converter and a second power transmitting condition in which the driving power of the engine is transmitted to the wheels without the power transmitting system of the torque converter;

an oil pump driven by the driving power of the engine to supply oil to the clutch mechanism and the torque converter to operate them;

a continuously variable transmission supplied with oil by the oil pump to actuate pulleys by hydraulic pressure of the oil to continuously vary a transmission ratio of the continuously variable transmission;

a clutch control device configured to selectively operate the clutch mechanism in accordance with a vehicle condition to position the clutch mechanism in either the first power transmitting condition or the second power transmitting condition; and an engine control device configured to idle-stop the engine by automatically stopping the engine when vehicle speed is reduced below a predetermined value and to restart the engine when an accelerator pedal is depressed or brakes are released during an idle-stop condition of the engine;

wherein the engine control device is configured to start the engine when a vehicle speed of the vehicle has been increased during the idle-stop condition.

9. A power transmitting apparatus, comprising:
a torque converter having a torque amplifying function;
a clutch mechanism configured to be positioned in a first power transmitting condition in which driving power of an engine is transmitted to driving wheels of a vehicle via a power transmitting system of the torque converter and a second power transmitting condition in which the driving power of the engine is transmitted to the wheels without the power transmitting system of the torque converter;

an oil pump driven by the driving power of the engine to supply oil to the clutch mechanism and the torque converter to operate them;

a continuously variable transmission supplied with oil by the oil pump to actuate pulleys by hydraulic pressure of the oil to continuously vary a transmission ratio of the continuously variable transmission;

a clutch control device configured to selectively operate the clutch mechanism in accordance with a vehicle condition to position the clutch mechanism in either the first power transmitting condition or the second power transmitting condition; and an engine control device configured to idle-stop the engine by automatically stopping the engine when vehicle speed is reduced below a predetermined value and to restart the engine when an accelerator pedal is depressed or brakes are released during an idle-stop condition of the engine;

wherein the engine control device is configured to not start the engine, irrespective of release of braking operation, when the vehicle speed is not zero in the idle-stop condition.

10. A power transmitting apparatus, comprising:
a torque converter having a torque amplifying function;
a clutch mechanism configured to be positioned in a first power transmitting condition in which driving power of an engine is transmitted to driving wheels of a vehicle via a power transmitting system of the torque converter and a second power transmitting condition in which the driving power of the engine is transmitted to the wheels without the power transmitting system of the torque converter;

an oil pump driven by the driving power of the engine to supply oil to the clutch mechanism and the torque converter to operate them;
a continuously variable transmission supplied with oil by the oil pump to actuate pulleys by hydraulic pressure of the oil to continuously vary a transmission ratio of the continuously variable transmission;
a clutch control device configured to selectively operate the clutch mechanism in accordance with a vehicle condition to position the clutch mechanism in either the first power transmitting condition or the second power transmitting condition;
an engine control device configured to idle-stop the engine by automatically stopping the engine when vehicle speed is reduced below a predetermined value and to restart the engine when an accelerator pedal is depressed or brakes are released during an idle-stop condition of the engine;
a hydraulic valve mechanism having a first supplying path for supplying oil to the torque converter during an ordinary operation, a second supplying path configured to limit or inhibit the supply of oil to the torque converter, and a valve for opening and closing the first supplying path by hydraulic pressure; and
a plurality of solenoids configured to selectively operate the hydraulic valve mechanism, the solenoids being set to an "OFF" state during the idle-stop condition.

11. The power transmitting apparatus of claim 10, wherein the torque converter comprises a pump, a turbine, and an output shaft connected to the turbine, wherein the clutch mechanism is connected operatively between the output shaft of the torque converter and the driving wheels and is configured such that, when the clutch mechanism is in the second power transmitting condition, the driving power of the engine is transmitted to the driving wheels without passing through the output shaft of the torque converter.

12. The power transmitting apparatus of claim 10, wherein the torque converter comprises a pump and a turbine, and wherein the power transmitting apparatus further comprises an output shaft connected to the pump, wherein the clutch mechanism is connected operatively between the output shaft and the driving wheels and is configured such that, when the clutch mechanism is in the second power transmitting condition, the driving power of the engine is transmitted to the driving wheels via the output shaft of the pump.

13. A power transmitting apparatus, comprising:
a torque converter having a torque amplifying function;
a clutch mechanism configured to be positioned in a first power transmitting condition in which driving power of an engine is transmitted to driving wheels of a vehicle via a power transmitting system of the torque converter and a second power transmitting condition in which the driving power of the engine is transmitted to the wheels without the power transmitting system of the torque converter;
an oil pump driven by the driving power of the engine to supply oil to the clutch mechanism and the torque converter to operate them;
a continuously variable transmission supplied with oil by the oil pump to actuate pulleys by hydraulic pressure of the oil to continuously vary a transmission ratio of the continuously variable transmission;
a clutch control device configured to selectively operate the clutch mechanism in accordance with a vehicle condition to position the clutch mechanism in either the first power transmitting condition or the second power transmitting condition; and
an engine control device configured to idle-stop the engine by automatically stopping the engine when vehicle speed is reduced below a predetermined value and to restart the engine when an accelerator pedal is depressed or brakes are released during an idle-stop condition of the engine; and
an accumulator configured to accumulate oil, the accumulator being configured so that the oil accumulated in the accumulator is discharged therefrom to the clutch mechanism and the continuously variable transmission when the vehicle speed is reduced below a predetermined value with the engine being fuel-cut during a process of speed reduction of the vehicle.

* * * * *